June 5, 1934.    S. SONODA    1,961,647
THREAD GAUGE
Filed July 2, 1929    2 Sheets-Sheet 1
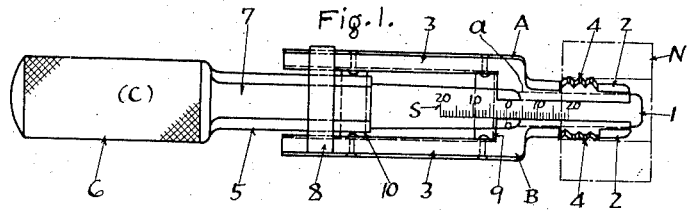
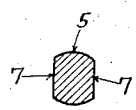
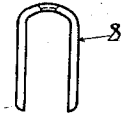
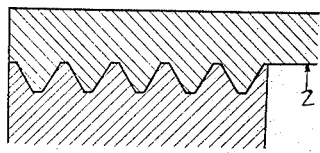
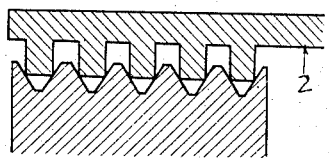
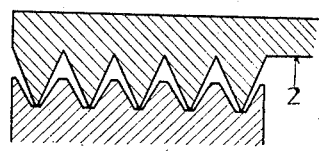
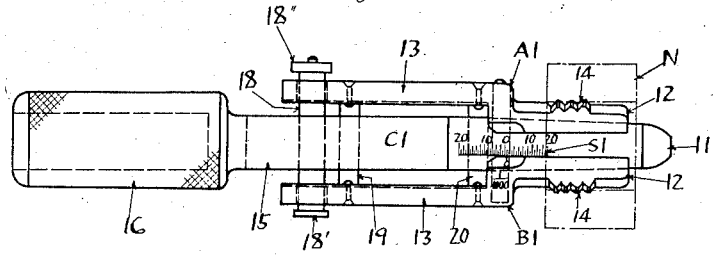
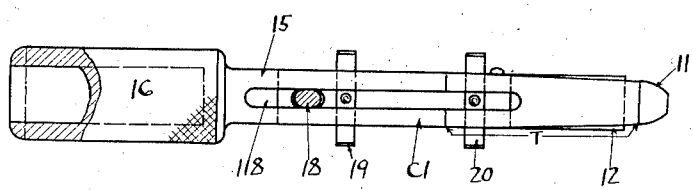
Inventor
Soshichi Sonoda
by Marks & Clerk
His Attorney June 5, 1934.  S. SONODA  1,961,647
THREAD GAUGE
Filed July 2, 1929  2 Sheets-Sheet 2
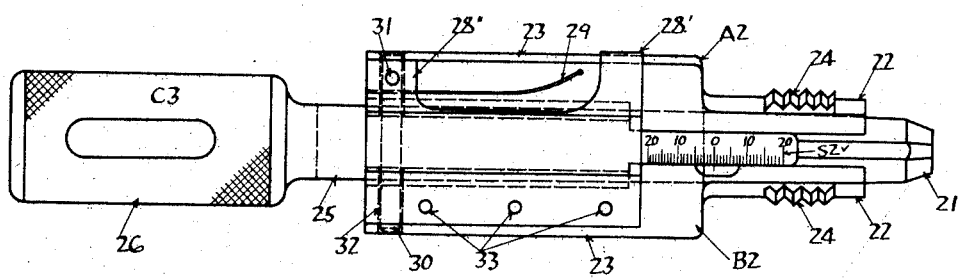
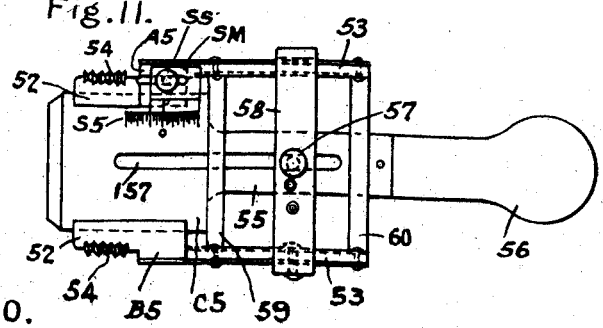
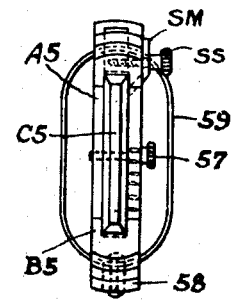
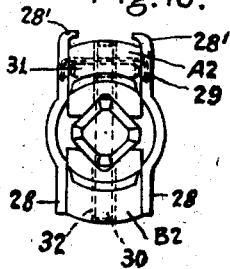
Inventor
Soshichi Sonoda
by Marks & Clerk
His Attorney Patented June 5, 1934

1,961,647

UNITED STATES PATENT OFFICE 1,961,647

THREAD GAUGE

Soshichi Sonoda, Itabitsu, Kokura, Japan

Application July 2, 1929, Serial No. 375,469

4 Claims. (Cl. 33—199)

My invention relates to an instrument for measuring the exact dimensions of inside screw threads.

The object of my invention is to provide an effective and handy means which is simple in construction for obtaining correct measure of an inside screw thread by merely inserting the instrument into the threaded hole without rotation, so that it can be handled very conveniently and carried to any corner of the factory.

It is said among mechanical engineers that the technical ability of a certain iron works can be judged by simply observing a bolt or nut which is made or used in the workshop. This fact illustrates how important and difficult a task it is to obtain exactly finished screw threads in a bolt or nut.

It is mainly due to the fact that the exact inspection of a screw thread particularly of an inside screw thread is very difficult and there is no satisfactory method or means to measure it simply and easily, so that it has been almost impossible to detect exactly where the defects are. Especially for threaded holes of comparatively small diameter, such as nuts, sockets, T's and elbows for pipe joints, or stay bolt holes for locomotive boilers, there are no simple and correct means to indicate the errors in inside diameter with accuracy to the extent of one-thousandth of an inch, or one-hundredth of a millimeter, so that the workman cannot find out if the diameter or pitch of an inside screw thread is defective, or at exactly what point it is so.

For inspecting the dimensions of threaded holes of comparatively small diameter, it has heretofore been proposed to use a plug gauge which is to be screwed in a desired article, or to split the article and observe with an apparatus such as a comparator.

But none of such means or methods are effective in inspecting a number of threaded holes rapidly and accurately, and they cannot be applied to every article having inside screw threads manufactured in a factory.

My invention will be better understood by referring to the accompanying drawings forming a part of this specification and in which:

Fig. 1 is a side view of the inside screw thread gauge, or tester embodying my invention; Fig. 2 shows the cross section of the shank of the plug member of my gauge; Fig. 3 is a side view of the U-shaped guide member; Figs. 4 to 6 inclusive are sections showing various forms of the contact projections on the contact pieces relative to the screw thread, wherein Fig. 4 shows an example of a complete screw thread, Fig. 5 is suitable for measuring the effective diameter of a screw thread and Fig. 6 is intended for measuring the diameter at the bottom of an inside screw thread; Fig. 7 is an elevation of a modified form of my invention; Fig. 8 is a plan view partly in section, of Fig. 7; Fig. 9 is an elevation of another modification of my invention; Fig. 10 is an end view of Fig. 9; Fig. 11 shows another modification of my invention suitable for measuring a comparatively large internal diameter of threaded holes; and Fig. 12 is its end view.

Now referring to Figs. 1 to 3, A and B represent the resiliently connected split contact pieces, C is a plug member having a tapered stem, and N shown by the dot and dash lines represents a nut the inside diameter of which is to be measured.

The contact pieces A and B are preferably made originally in one piece and split into two symmetrical pieces through the center line, after having finished thereon the contact projections 4, 4 and a tapered hole made through the longitudinal axis, which last forms a tapered contact surface by which the contact pieces slidably fit to the tapered plug member C.

The contact pieces A and B each have a working or measuring part 2, provided on its outer surface with projections 4, for measuring purposes and having an inner tapered surface "$a$" formed complementary to the tapered stem of the plug member C, and an offset shank portion 3. The portions 3, 3 are resiliently connected together by means of annular springs 9 and 10, which hold the contact pieces A and B apart, or if desired said springs may be arranged to act in a reverse direction as will be explained below. A guide member 8 is fixedly mounted on one of the contact pieces A, and said member tightly embraces the shanks 3, 3, and the stem of the plug member C, in a manner permitting relative movement of the enclosed elements in correct alignment.

The plug member C consists of a tapered portion 1 provided with graduations S on one or both sides thereof, and the stem 5 provided with flat parallel guide surfaces 7 on both sides of same, and the knurled handle 6. For instance, if the taper of the part 1, be 1 in 25 in its diameter and the graduation be made by 1/40 of an inch along the length, the difference of one division will indicate an error of one-thousandth of an inch.

In the type of the device in which the springs 9 and 10 are designed to exert an outward pressure against the contact pieces A and B the method of using the instrument is as follows: At first pull out the plug member C to the left of Fig. 1 for a certain length, then grasp the shanks 3, 3 with the thumb and fingers to press the contact pieces together and insert them into the threaded hole to be measured. If the force of the fingers is now removed the contact pieces will expand automatically by the action of springs 9 and 10, and fit into the inside of screw threads being measured. The end of the tapered plug member C is next inserted between the beveled portions of parts 2, 2 and the graduations on the tapered rod which indicate the relative displacement of the tapered rod, read with reference to the zero point of the contact pieces, so that the diameter of the threaded hole being measured is readily determined, and if for instance the reading is 2 as indicated by the graduations, then the size of the measured hole is two thousandths of an inch larger or less than the normal dimension of the screw threads, according as the position of the zero point, of the graduated scale is found at the right or left of the fixed zero point on the portion 2 of the contact piece B, and clearly illustrated in Fig. 1 of the drawings. It should especially be noted in using my device that the contact pieces 2, 2, are inserted directly into the threaded hole being measured and the nut or instrument does not need to be rotated, as is necessary in case of an ordinary plug gauge.

In my invention the shape or form of the contact teeth 4, 4 can be made to suit the particular use desired. For instance when the "effective" internal diameter of a screw thread is desired the teeth 4, 4 can be made as illustrated in Fig. 5; or if the dimensions of the bottom of the threads is desired a shape of contact teeth 4, 4 is used, illustrated in Figure 6.

If the same screw threaded hole gives different readings at one point than at another, or if the measuring instrument is engaged with a number of internal threads, the readings of the graduated scale of my device vary, this will at once indicate that the pitch of the screw threads being measured are not homogeneous, and are incorrect.

In an embodiment of my invention shown in Figs. 7 and 8, the split contact pieces A1 and B1 are resiliently connected together by two ring springs 19 and 20 in a manner similar to that shown in Fig. 1, and instead of the U-shaped guide member a longitudinal slot 118 and a guide pin 18 are used as guiding means. The guide pin 18 is provided with the head 18' on one end, and a nut 18" on the other end thereof, to allow the movement of the shanks along with the pin, and thereby permits the contact pieces to be guided more exactly than with the type shown in Fig. 1. The type of construction of Figs. 7 and 8 more securely holds the parts together so as not to be lost by carelessness in the shop where they are used. The parts 11, 12, 13, 14, 15 and 16 in Figs. 7 and 8 correspond respectively to the parts 1 to 6 inclusive of the arrangement shown in Fig. 1.

In the embodiment of my invention shown in Figs. 9 and 10, I have shown a different manner of resiliently joining the contact pieces A2 and B2, and guiding the tapered plug member C3 carrying the handle 26. 22, 22 represent the working parts of the contact pieces to be inserted into a threaded hole, and 24, 24 represent the contact projections of the contact pieces A2, and B2. 23, 23 represent the shanks of said contact pieces and S2 represents the graduations on the tapered member C3. One of the most important features of this modification is that the contact surfaces between the contact pieces 22, 22 and the end 21 of the tapered plug member C3 are formed to V-shaped tapering surfaces as clearly seen from Fig. 10, that is, the plug member has plane pyramidal outer surfaces instead of a conical surface. The advantage of this construction is that, the reading given by the graduation S2 shows more accurately the errors in the screw thread being measured, because, in the case of conically tapered members such as C of Fig. 1, some clearance might exist between the contact surfaces both on the upper and lower side of the tapered member C when the diameter of the threaded hole being measured is larger than the theoretical exact size, owing to the fact that for instance the tapered member and contact pieces make line contacts on both sides of the top line, and the bottom line of the tapered plug member; and thus there remains clearance between the inside of the contact pieces, and the top and bottom sides of the tapered member. This condition causes errors in the readings of the graduations which appear smaller than the real size of the threaded hole measured, that is to say a false indication of the size of the threads. But with the V-shaped or plane tapered sliding surfaces shown on Figs. 9 and 10, above described and also the type shown in Figs. 11 and 12, the reading of the graduations on the tapered member also indicate the actual and exact amount of error in diameter of the screw threaded hole. It is evident in the form of the device shown in Figs. 9 and 10, the guiding means of the contact pieces A2, B2, and the operation of the tapered member C3 are more desirable than in the previously described forms of the device in hand.

In these Figures 9 and 10, 30 represents a guide pin which is fixed at one end to the shank of the contact piece A2 by a small pin 31, and is slidably fitted into a hole 32 in the shank 23 of the opposite contact piece B2. Said guide pin 30 also slidably pierces through the axial slot 25 of the tapered rod C3. 28, 28 represent guide plates which are firmly mounted at one end to the sides of the contact piece B2 by rivets 33, or other suitable means, and said guide plates slidably hold the other contact pieces A2 between them, the free ends 28' of said guide plates being bent inwardly so as to limit the outward movement of the contact piece A2. In order to cause the contact pieces to move toward each other a U-shaped spring 29 is provided, the medial portion being loosely mounted through the contact piece A2 while the ends of the limbs are fixed to the projections 28", 28" of the respective guide plates 28.

In Figs. 11 and 12 I have shown a construction which is especially adapted for measuring a comparatively large screw threaded hole, such as pipe fittings, etc. Referring to these figures A5, B5 and C5 indicate the two contact pieces and the tapered plug member respectively and 53, 53, represent the shanks of the contact pieces; 54, 54 represent the contact projections formed on the working or measuring parts 52 of the contact pieces; 55 represents the shank of the plug member C5 and 56 the handle; 58 represents a box shaped guide frame having a rectangular hole which slidably holds the shanks 53, 53, of the contact pieces A5, B5 together. A guide pin 57 pierces the guide frame 58 and engages the longitudinal slot 157 of said tapered member C5 as shown. Thus the relative movements between the contact pieces A5, B5 and the tapered member C5 are satisfactorily guided by the box shaped frame 58, and pin 57. 59 and 60 represent leaf springs which resiliently connect the contact pieces A5 and B5. SM represents an adjustable indicator fitted on the contact piece A5, and SS represents a set screw for clamping the adjustable indicator SM in a desired position relative to scale S5. This construction facilitates the easy adjustment of the scale by loosening the part SS.

What I claim as new and desire to secure by Letters Patent of the United States, is:—

1. An instrument for testing the diameter of an inside screw thread, comprising a pair of elongated relatively movable and parallel contact pieces, each including a working part and a shank, each working part having a helical projection as a part of a continuous screw thread, and a longitudinally tapered inner surface of V-shaped cross-section, a pair of guide members enclosing said contact pieces, and mounted on one of them, means for resiliently urging said contact pieces at their shank ends toward one another, consisting of a U-shaped spring wire mounted in the shank of one of the contact pieces, and secured at each of its ends to one of the guide members, and a plug member having cross-sectionally V-shaped and tapered side edges, adapted to slidably and reciprocally engage the corresponding tapered surfaces of the contact pieces, and having means for determining the relative positions of the plug and the contact pieces.

2. An instrument for testing the diameter of an inside screw thread, comprising a pair of opposed elongated relatively movable contact pieces, each including a working end and a shank, a pair of guide plates mounted on the shank of one of the contact pieces, each having an inwardly turned end enclosing the shank of the other contact piece to prevent dislodgment of same, a plug having a longitudinal slot therethrough, and a working end adapted to be entered between the working ends of the contact pieces, a guide pin mounted in the shank of one of the contact pieces, in engagement with the plug slot and the shank of the other contact piece, for guiding the plug within the contact pieces when the former is reciprocated, and resilient means mounted in one shank and the guide plates for holding the shanks of the contact pieces in sliding contact with the plug member.

3. An instrument for testing the diameter of inside screw threads, comprising a pair of oppositely disposed relatively movable contact pieces each including a working part and a shank, each working part having a helical projection as a part of a continuous screw thread, and a V-shaped inner tapered surface thereon, a plug member having a tapered end and complementary V-shaped surfaces thereon adapted to be entered between the contact pieces for the purpose of diametrically expanding same until the helical projections contact the threads of the inside screw threads being measured, said plug also being provided with indicating means for determining the relative over or under-size of the screw threads according to the reading of said indicating means, and means for holding the contact pieces coaxial, with the plug member, when the latter is reciprocated between the contact pieces of the device.

4. An instrument for measuring inside screw threads comprising a pair of parallel elongated and relatively movable contact pieces each including a working part and an offset shank, each working part being formed with contact projections on its outer side surface constituting a part of a continuous screw thread and having its inner surface tapered, a plug member including a stem having tapered side edges adapted to engage the corresponding tapered inner surface of the working parts of said contact pieces, cooperative guiding means connected to at least one of the offset shanks for permitting longitudinal movement of the plug member and resisting relative rotation of the same, and resilient means carried by and acting on at least one of the shanks and tensioned to normally cause the working parts of the contact pieces to move relative to each other and said plug member also having graduations marked on its stem to indicate the relative position of the working part of the contact pieces with reference to the plug member.

SOSHICHI SONODA